Sept. 9, 1952  R. FREEDMAN ET AL  2,609,795
WINDSHIELD WIPER SYSTEM
Filed Oct. 4, 1945
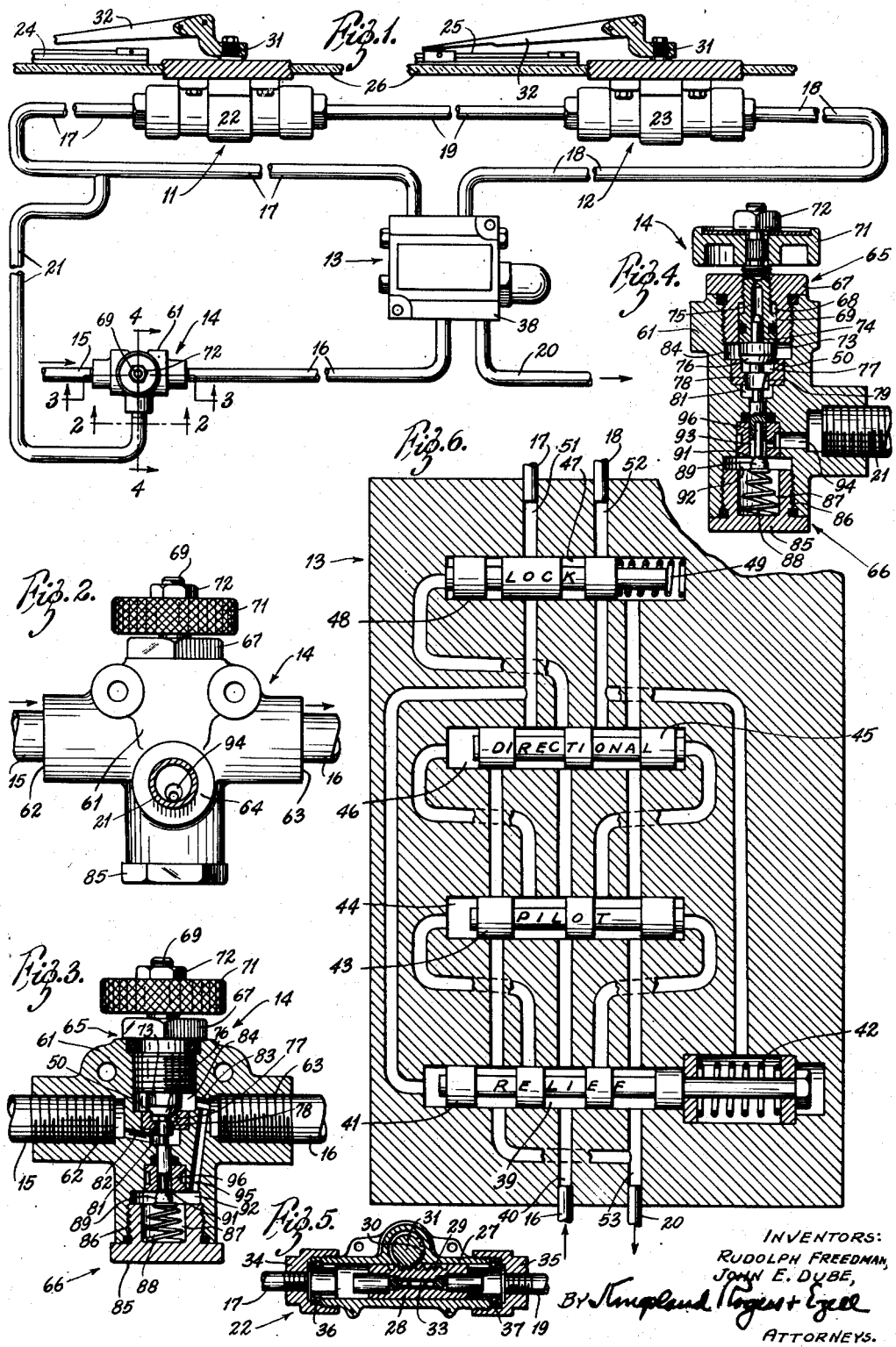
INVENTORS:
RUDOLPH FREEDMAN,
JOHN E. DUBE,
ATTORNEYS.

Patented Sept. 9, 1952

2,609,795

UNITED STATES PATENT OFFICE 2,609,795

WINDSHIELD WIPER SYSTEM

Rudolph Freedman, University City, and John E. Dube, Chesterfield, Mo., assignors, by mesne assignments, to Alco Valve Co., St. Louis, Mo., a corporation of Missouri Application October 4, 1945, Serial No. 620,316

6 Claims. (Cl. 121—158)

This invention pertains to improvements in hydraulic windshield wipers and concerns itself primarily with improved apparatus providing for the parking of the wiper blades automatically.

It is a general aim of the invention to provide a hydraulic windshield wiper device having means for moving a wiper blade to a selected position automatically and maintaining the blade in this position when the device is not operating.

More specifically, it is an object of the invention to provide a hydraulic windshield wiper device having a speed control valve capable of controlling the flow of fluid to its wiper units in a manner such as to move the blades of the wiper units to a selected position automatically and maintain them in this position, commonly referred to as their "parked" or "parking" position.

Another object of the invention is to provide a hydraulic windshield wiper system with an improved speed control valve automatically operable, upon movement to stop the system's wiper units, to move the wiper blades to a parked position.

It is a further object of the invention to provide an improved speed control valve for a hydraulic windshield wiper system having, in addition to a metering valve, a parking valve operable upon the closing of the former to supply fluid to a wiper unit line of the system so as to automatically move the respective wiper blades to a parked position.

A still further object of the invention is to provide an improved hydraulic windshield wiper system having means operable to bypass fluid around the system's control unit to a wiper unit line upon initial stoppage of fluid to the control unit.

Other objects and advantages will become apparent as the description proceeds, and a more comprehensive understanding of the invention will be afforded from the following detailed description when considered in conjunction with the accompanying drawing, in which:

Fig. 1 is a plan view of a hydraulic windshield wiper system embodying the instant invention;

Fig. 2 is a side elevational view of a speed control valve employed in the system illustrated in Fig. 1 taken along the line 2—2 thereof;

Figs. 3 and 4 are vertical sectional views of the speed control valve shown in Fig. 2 as taken along the lines 3—3 and 4—4 of Fig. 1;

Fig. 5 is a vertical section of a window wiper unit employed in the system illustrated in Fig. 1; and Fig. 6 is a diagrammatic illustration of the system's control unit showing the various parts thereof.

A hydraulic windshield wiper system embodying the instant invention is illustrated in Fig. 1 and contemplates the use of a pair of wiper units 11 and 12, a control unit 13 and a speed control valve 14. Fluid under pressure is admitted to the speed control valve 14 through a line 15 where it is metered for transmission through a line 16 to the control unit 13. From the latter device, a line 17 supplies fluid to the window wiper unit 11 and a line 18 supplies fluid to the window wiper unit 12. Both wiper units are connected by a line 19 which transmits fluid therebetween, and fluid from each unit is exhausted through the control unit 13 to a line 20 which carries it to a reservoir (not shown). From the speed control valve 14, a line 21 is connected into the line 17 feeding the wiper unit 11 which provides a bypass for metered fluid from the downstream side of the speed control valve 14 around the control unit 13.

With the system just described, fluid under pressure is directed by the control unit 13 alternately to the hydraulic motors 22 and 23 of the wiper units 11 and 12, respectively, in a manner such that their wiper blades 24 and 25 are moved back and forth across sector areas of the windshield 26 to maintain the same clear of the elements and provide clear visibility through the windshield.

As is more fully described in a copending application, Serial No. 529,964, filed April 7, 1944, now Patent No. 2,516,594, issued July 25 1950, by Howard E. Rose, the hydraulic motor 22 comprises a cylinder 27 (Fig. 5) in which a double-acting piston 28 is operative. The latter element is provided on a portion of its external surface with a rack 29 which is meshed with a pinion 30 fixed to a splined shaft 31 on which a windshield wiper arm 32 is carried. Located within the piston 28 is a double-acting relief valve 33. The unit is also provided within its end connections 34 and 35 with dashpot check valves 36 and 37, and the unit is supplied fluid through the lines 17 and 19 to move the piston 28, as will be described later.

Since the hydraulic motors 22 and 23 are identical with the exception of their connecting lines and arrangement in the system, only one will be described.

The control unit 13, which directs the flow of fluid to the hydraulic motors 22 and 23 in a manner to reciprocate the wiper blades 24 and 25, comprises a valve body 38 in which there is channeled a plurality of conduits interconnecting four valve cavities retaining four hydraulically operated valves. Under fluid pressure received from the line 16, three of these valves are manipulated to alternately apply pressure to the motors 22 and 23, the said fluid being exhausted from the motor not receiving high pressure fluid through the control unit 13 and the line 20 back to storage. Inasmuch as the physical characteristics of this unit are described in detail in the aforementioned copending application, they will be treated here only briefly to the extent necessary to describe the function of the unit.

As previously stated, high pressure fluid is admitted to the unit through the line 16. This line in turn is connected to a valve cavity 39 by means of a conduit 40. Within the cavity 39 a sliding valve 41 is operative. This valve, termed a double-acting relief valve, is biased to its neutral position by a spring 42, but is otherwise hydraulically operated. Through its operation, a second sliding valve 43, known as a pilot valve, is controlled. This valve is entirely pressure operated and functions in a valve cavity 44. A third sliding valve 45, described as a directional valve, moves within a cavity 46 and controls the flow of high pressure fluid to either line 17 or 18 depending upon which motor is to receive it. Within a valve cavity 47, a locking valve 48 is biased to its illustrated position by a spring 49.

The lines 17 and 18 are connected with the valve cavity 47 by two conduits 51 and 52, respectively, and the exhaust line 20 communicates with the cavity 39 by means of a conduit 53. Each of the valve cavities has interconnecting conduits. Also, the various valves have reduced sections which permit a flow of fluid around the valve. The points of entry of the various conduits into the valve cavities form ports which are opened and closed depending on the particular section of the valve moved over them. Conduits are also provided to apply pressure to the end sections of the various valves to effect their movement in their respective cavities.

Although the control unit 13 directs the flow of fluid to the wiper units, it is incapable of controlling the speed at which they operate. This function is performed by a speed control valve 14 which has for an additional purpose the automatic parking of the wiper blades. The first object is accomplished by controlling the rate of flow of fluid admitted to the control unit 13, and the second by automatically bypassing fluid under pressure from the metered side of the speed control valve around the control unit 13, into the wiper line 17.

As illustrated in Figs. 2 to 4, inclusive, this device comprises a valve body 61 provided with a pressure inlet 62, a pressure outlet 63, and a parking outlet 64. Each of these portions of the valve body is tapped and threaded to receive, respectively, the lines 15, 16 and 21. The valve body 61 is bored vertically normal to the inlet and outlet openings to provide valve cavities in which both a metering valve assembly 65 and a parking assembly 66 are inserted.

The former assembly comprises a cap 67 which is screwed into the valve body 61, as shown. Movable within a bore 68 within the cap 67 is a threaded stud 69 to which is splined a thumb wheel 71. The latter element is secured on the stud 69 by means of a nut 72. With this arrangement of the parts, the stud 69 may be raised or lowered to bear against a metering stem 73, carrying on its upper surface a pin 74 which is fixed within a central bore 75 in the stud 69. The metering stem 73 is turned with an oblique surface 76 which seats against a shoulder 50 provided in the valve body. Communicating with a valve cavity 77 is a section 78 of the metering stem 73, channeled at 79, which, when the latter is raised, introduces an opening of progressively increasing cross-sectional area between the valve cavity 77 and a valve cavity 81. Thus, as the stud 69 is moved upwardly, an increased amount of fluid is permitted to flow from the inlet opening 62 through a port 82, the valve cavities 81 and 77, to a port 83 connecting a valve cavity 84 with the outlet opening 63.

Opposite the metering valve assembly 65, which is screwed into the top of the valve body, is the parking valve assembly 66. This latter device comprises a cap 85, which is threaded at 86 to be inserted in the valve body 61. It is provided with a bore 87 in which a compression spring 88 is retained. A ball valve 89 is seated in the top of the spring 88 and is biased thereby to seat against a valve seat 91 forming a part of an opening from a valve cavity 92 which, in turn, communicates with another valve cavity 93 immediately above. The latter valve cavity is connected by a port 94 which communicates with the parking outlet 64 in the valve body 61.

The port 83 which connects with the pressure outlet opening 63 is connected with the valve cavity 92 by a port 95 which conducts fluid from the outlet side of the valve to the parking outlet 64.

The metering valve 79 is opened when the stud 69 is moved upwardly by turning the thumb wheel 71 and is closed against pressure by screwing it downwardly. The ball parking valve 89, on the other hand, is biased to its closed position by the spring 88 and is opened by downward movement of the metering stem 73. In this case, the ball 89 is moved at a selected point of travel of the metering stem 73 by an extension 96 thereof.

Operation

For the purpose of describing its operation, the system will be assumed to be stopped after a previous use. In this condition, the wiper blades 24 and 25 will occupy parked positions opposite to those illustrated in Fig. 1, and the entire system will be considered as being filled with fluid. Further, the various valves of the control unit 13, with the exception of the locking valve, will occupy positions opposite to those illustrated in Fig. 6. As as further aid to the description of the system's operation, quantitative fluid pressure valves will be used although it is to be expressly understood that the system is not to be limited to any particular operating pressure or pressures, nor to any particular pressure exerting medium.

When it is desired to place the system in operation, high pressure fluid which is impressed upon the system from a proper source through the line 15 is admitted to the system by opening the metering valve of the speed control unit. The opening of this valve is accomplished by turning the thumb wheel 71 in a counterclockwise direction, and the rate of flow of fluid passing from the inlet to the outlet connection of this valve around the metering section 78 of the metering valve is controlled by the cross-sectional area of the channel 79 which is open. From the speed control valve 14, metered fluid is transmitted through the line 16 to the control unit 13. From this point, and by starting the operating cycle so as to conform to the illustrated positions of the valves 41, 43, 45 and 48, high pressure fluid is transmitted through the conduit 40, and through the various valve cavities and communicating conduits to the left of the lock valve 48 which moves it against the compressive forces of the spring 49 to move the valve's recessed portions into coincidence with the ports of the conduits 51 and 52, respectively. Upon this operation, the control unit is released from its locked position and high pressure fluid can be ported to either of the lines 17 or 18 by the control unit.

At the time high pressure fluid is acting on the lock valve 48, it is also acting against the left end section of the relief valve 41, where it acts against the forces of the spring 42. Since the pistons of the hydraulic motors 22 and 23 are moved to their extreme right hand positions, pressure of the fluid through the line 17 to the wiper unit 11 builds up to a value of approximately 450 pounds per square inch, which is equivalent to the active forces of the spring 42. Since this pressure is sufficient to overcome the action of the spring 42, the relief valve is moved to the right, and fluid is ported to the right of the pilot valve 43 moving the same to the left. As the pilot valve 43 is moved to the left, high pressure fluid is ported against the directional valve 45 to likewise move it to the left. Since fluid from the pilot valve to the directional valve is restricted in its flow, as by having the middle land of the pilot valve only partially uncover the pressure port, as shown, the valve 45 moves more slowly than does the valve 43, and, accordingly, a full stroke of the valve 43 is assured. As the directional valve is moved to the left, high pressure is ported into the line 18, and the line 17 is connected with the low pressure line 20, causing the pistons of the hydraulic motors 22 and 23 to move to the left and reverse the wiper stroke. As soon as this occurs, the double-acting relief valve 41 is no longer pressure actuated, and the same is moved to its neutral position by the spring 42. Under assumed conditions, the maximum operating pressure is approximately 400 pounds per square inch, which is insufficient to shift the relief valve 41 from its neutral position, the spring 42 being selected to require a pressure of 450 pounds per square inch to move the valve from its neutral position.

Since both of the double-acting valves 33 of the hydraulic motors 23 and 22 are set for operation at 250 pounds per square inch, there is a pressure drop across the two approximating 500 pounds per square inch. Further, the piston of the hydraulic motor 23 reaches its left end position before the piston of the hydraulic motor 22 reaches its extreme end position. This causes the fluid to flow through the relief valve into the line 19, moving the piston of the motor 22 to its extreme left end position. The operating pressure of 400 pounds per square inch, however, is not sufficient to flow through the two relief valves of the hydraulic motors 23 and 22, since both of them are in series and offer a combined pressure drop of 500 pounds per square inch. Hence, fluid pressure in the line 18 builds up to a value of 450 pounds per square inch, which is sufficient to operate the relief valve 41, and the entire sequence of operation is repeated with the valves of the control unit 13 and the pistons of the hydraulic motors 23 and 22 moving in an opposite direction to that described. Thereafter, and under the control of the control unit 13, high pressure fluid is directed alternately to the lines 17 and 18 and the wiper blades 24 and 25 are continuously moved over the windshield 26.

When it is desired to stop the system and also to move the blades 24 and 25 to a selected parked position, the metering valve 78 of the speed control unit 14 is closed by turning the thumb wheel 71 in a clockwise direction.

As the thumb wheel 71 is closed, the metering stem 73 is moved downwardly and at a predetermined distance in its travel, an extension 96 thereof presses against the ball valve 89 of the valve assembly. Such action causes the valve 89 to open against the forces of the valve spring 88 and fluid flows from the metering valve into the ports 83 and 95, around the parking valve 89, through the port 94, and into the line 21, which is connected to the line 17 serving the wiper unit 11. If, at this time, the control unit 13 is porting high pressure fluid into the line 17, sufficient pressure will be built up therein to cause a reversal of the double-acting relief valve 41 within the control unit 13. Fluid will then be directed from the pressure outlet of the metering valve, through the control unit 13, to the line 18 to cause the motors 23 and 22 to move the blades 24 and 25 to the right. At this time, the control unit 13 has been conditioned to port the line 17 to the return line 20. Also, since the metering valve is being closed further during this time, sufficient pressure is not available in the wiper line 18 to cause the control unit to effect another reversal of the wiper units; hence, the wiper blades 24 and 25 remain in this parked position because continued turning of the thumb wheel 71 causes a complete closure of the metering valve, and pressure is cut off entirely from the wiper system.

Immediately upon closure of the metering valve, pressure is cut off from the system, and the compression spring 49 is operative to move the lock valve 48 to its extreme left hand position. This closes the ports of conduits 51 and 52, trapping fluid under pressure in the system above the control unit 13 and providing a hydraulic lock for the wiper blades in their parked position.

While a particular embodiment of the invention has been illustrated and described, it will be apparent that the invention is susceptible to other modifications or changes, such changes or modifications to which the invention is susceptible are to be considered covered as if described, and the invention is to be limited only by the appended claims.

What is claimed is:

1. In a control mechanism for controlling a reversible fluid pressure-operated motor and for parking the same in a predetermined position: a reversing mechanism having a high pressure inlet passage and a low pressure outlet passage, having a first working line and a second working line for opposite connection into the motor; having valve mechanism for first connecting one working line with the high pressure inlet and the other with the low pressure outlet, and then reversing said connections, there being fluid pressure-operated reversing valve means for causing such reversal, which valve means is oppositely ported to the two working lines to be shifted when the pressure in the working lines attains a predetermined differential resulting from obstruction of flow therein as when the motor is stopped; a speed regulating valve in one of the pressure passages to the reversing mechanism, the same being a throttling valve to adjust fluid flow through such passage whereby to regulate the rate of pressure fluid flow into the working lines so that the speed of the motor may be changed; a bypass connection from the pressure passage having the throttling valve, to one of the working lines, means normally closing the bypass connection; means associated with the throttling valve to open the bypass connection when the throttling valve is moved to a predetermined throttling position, to open the bypass passage and assure adequate pressure differential to reverse the reversing valve in one direction despite throttling of the throttling valve to a condition wherein such pressure differential cannot obtain, and thereby to provide for operation of the motor to a predetermined position where it will stop.

2. The combination of claim 1, wherein the throttling valve may be further moved to closed position to stop fluid flow.

3. The combination of claim 1, wherein there is a locking valve means to block outflow of pressure fluid from a working line, so as to restrain movement of the motor from parked position.

4. In a control mechanism for controlling a reversible fluid pressure-operated motor and for parking the same in a predetermined position: a reversing mechanism having a high pressure inlet passage and a low pressure outlet passage, having a first working line and a second working line for opposite connection into the motor; having valve mechanism for first connecting one working line with the high pressure inlet and the other with the low pressure outlet, and then reversing said connections, whereby the motor may be operated back and forth; a control valve in one pressure passage, that can be closed to cut the pressure flow in such passage whereby to stop the operation; and means to lock working line pressure conditions to restrain flow therein and hence to lock the motor in predetermined position, comprising a locking valve to block at least one of said working lines, and means to open said valve when the control valve is opened.

5. In a control mechanism for controlling a reversible fluid pressure-operated motor and for parking the same in a predetermined position: a reversing mechanism having a high pressure inlet passage and a low pressure outlet passage, having a first working line and a second working line for opposite connection into the motor; having valve mechanism for first connecting one working line with the high pressure inlet and the other with the low pressure outlet, and then reversing said connections, whereby the motor may be operated back and forth; a control valve in one pressure passage, that can be closed to cut the pressure flow in such passage whereby to stop the operation; and means to lock working line pressure conditions to restrain flow therein and hence to lock the motor in predetermined position, comprising a locking valve to block at least one of said working lines, and means to open said valve when the control valve is opened, comprising differential force means including a pressure chamber connected to the pressure passage having the control valve.

6. In a control mechanism for controlling a reversible fluid pressure operated motor, such as for windshield wipers, and for parking the motor and locking it in parked position: the combination of a control unit having a high pressure inlet, a low pressure outlet, a first working fluid line, a second working fluid line, and a reversing fluid valve mechanism having means to connect the two working lines respectively to the inlet and outlet, said means having a fluid pressure-operated device responsive to the increase in fluid pressure in the high pressure working line caused by resistance in the high pressure working line to reverse the connections of the two working lines with respect to the inlet and the outlet; a throttling valve in the high pressure inlet to regulate the pressure flow of fluid to the reversing control so as to regulate the pressure flow in the working lines and hence the speed of the motor; a bypass connection to conduct high pressure to one working line, means normally closing the bypass connection, means to open the bypass connection when the throttling valve is closed down to a predetermined throttling position, whereby to insure adequate pressure in such working line to reverse the reversing fluid valve mechanism despite throttling of the pressure in the inlet to below such reversing pressure; and means automatically operated by full closure of the inlet to close both working lines.

RUDOLPH FREEDMAN.
JOHN E. DUBE.

REFERENCES CITED

The following references are of record in the file of this patent:

UNITED STATES PATENTS

| Number | Name | Date |
| --- | --- | --- |
| 1,674,056 | Oishei et al. | June 19, 1928 |
| 2,045,140 | Horton et al. | June 23, 1936 |
| 2,344,949 | Rappl | Mar. 28, 1944 |
| 2,348,346 | Horton et al. | May 9, 1944 |
| 2,352,120 | Rappl | June 20, 1944 |